UNITED STATES PATENT OFFICE.

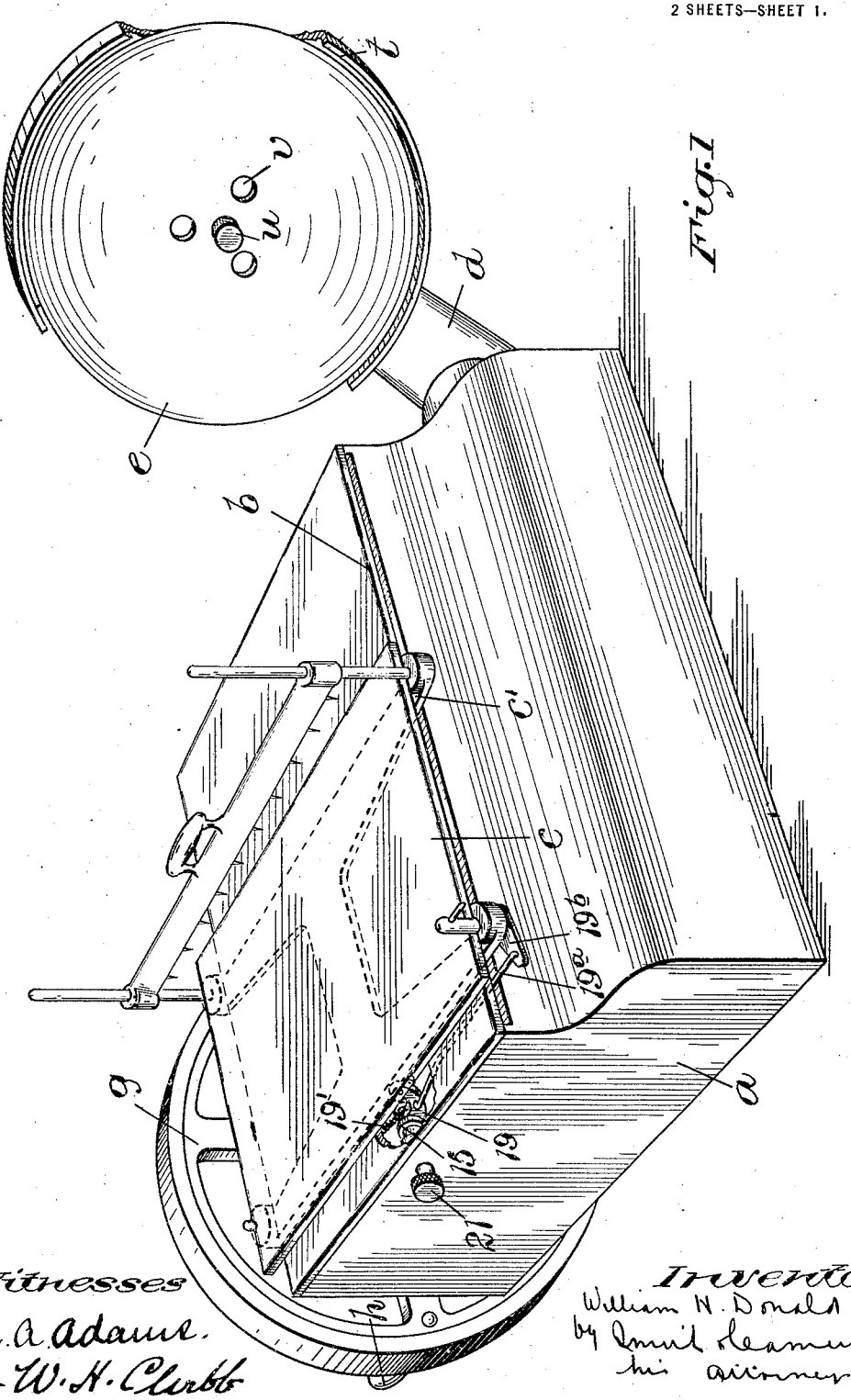

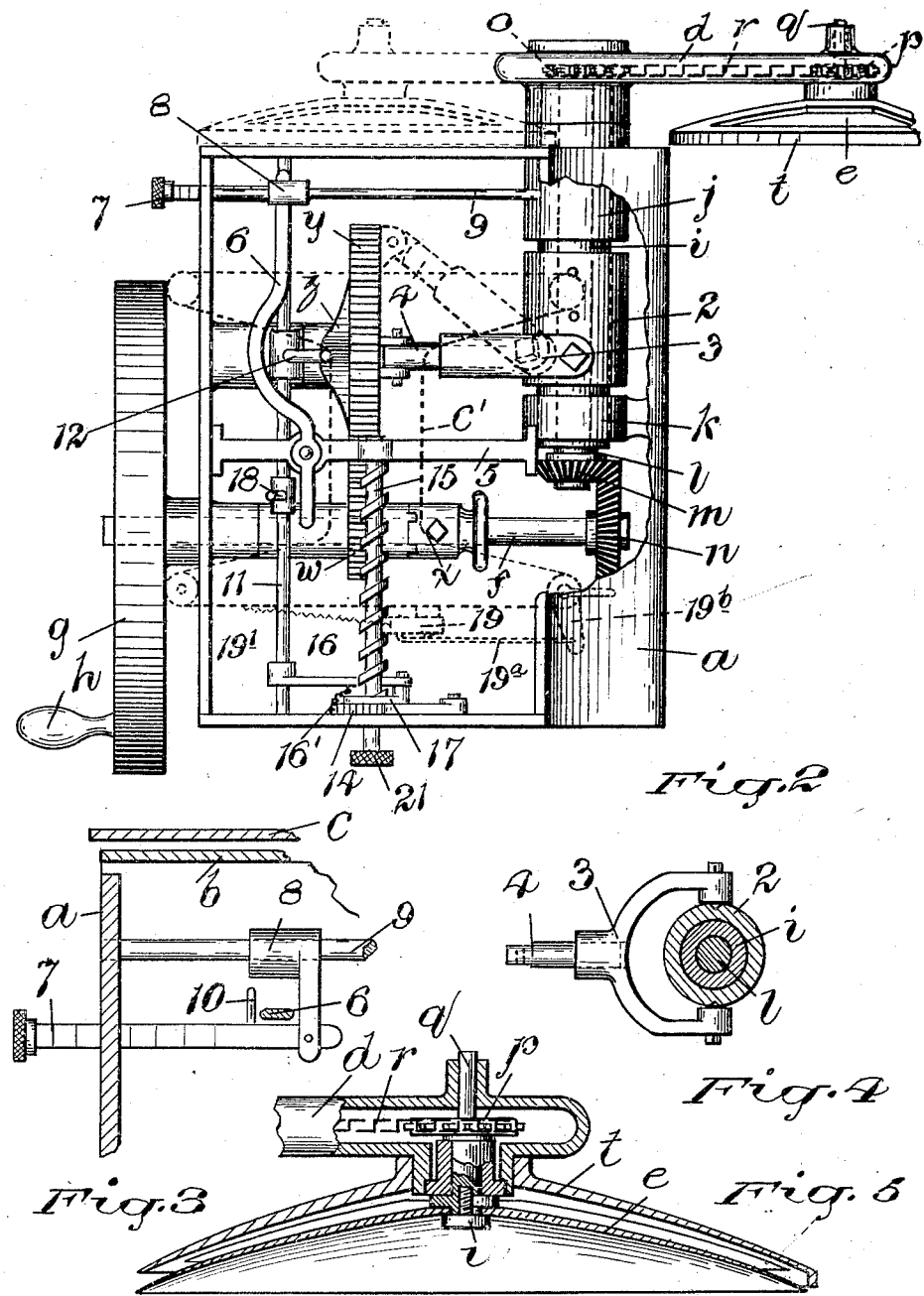

WILLIAM H. DONALD, OF TORONTO, ONTARIO, CANADA, ASSIGNOR OF ONE-HALF TO KENNETH C. LITTLE, OF TORONTO, ONTARIO, CANADA.

MEAT-SLICER.

1,362,855.  Specification of Letters Patent. Patented Dec. 21, 1920.

Application filed September 7, 1920. Serial No. 408,761.

*To all whom it may concern:*

Be it known that I, WILLIAM HECTOR DONALD, mechanical engineer, of the city of Toronto, in the county of York and Province of Ontario, Canada, have invented a new and useful Improvement in Meat-Slicers, of which the following is a full, clear, and exact description of the same.

My invention relates to a meat slicing device by which meat and other edibles may be cut in various thicknesses, and whereby the meat or other edibles will be regularly fed to the cutting section of the device to come into contact with the cutter.

The objects of my device are to construct a machine in compact form, with few working parts, and arrange all of the parts of the operating mechanism within a casing base to prevent dirt and grease from coming into contact therewith, and provided with a removable top, to readily facilitate in getting at the operating mechanism to make adjustments.

The cutting member of the device comprises a pivotally connected swinging arm fitted with a rotary circular cutting knife, that in course of actuation will travel over and against the cutting edge of the base and slice the meat with an advancing and sawing effect, with the result that I get a clean and regular cut, and very rapid in action.

In the drawings:

Figure 1 is a perspective view of the complete device;

Fig. 2 is a top plan view of the device with the cover and table removed and partially broken away to show the interior mechanism;

Fig. 3 is a fragmental sectional view of the feed adjusting mechanism;

Fig. 4 is a sectional detail of the swinging arm connection with the operating mechanism; and Fig. 5 is a sectional detail through the cutting disk, and a fragment of the swinging arm.

Like letters of reference refer to like parts throughout the specifications and drawings.

$a$ designates a suitable base preferably of a rectangular formation, in the nature of a casing, and $b$ is a top removably connected therewith. The object of making the top $b$ removable is to readily facilitate in getting at the operating mechanism located within the base, for making adjustments and for cleaning the interior parts.

$c$ designates a carrying table carried by a spider frame $c'$ adapted to ride on the top side edges of the base $a$ and under the top $b$. The table $c$ is adapted to travel lengthwise of the top $b$ to carry the meat to the front part of the device to bring it into contact with the cutting member, consisting of a swinging arm $d$ and a rotary disk knife $e$ carried on the outer end thereof, and adapted to be revolved at a high speed by a sprocket and chain drive, driven by operating mechanism located within the interior of the swinging arm.

Suitably journaled in lateral relation with the base $a$ is a drive shaft $f$, one end of the shaft extending out through the side of the base, and keyed on the outer end is a hand wheel $g$, fitted with an operating handle $h$ by which it may be turned.

Formed integral with the swinging arm $d$ is a sleeve $i$ adapted to extend into the interior of the base at right angles with the drive shaft $f$. The sleeve is suitably journaled in bearings $j$ and $k$, either formed integral with the base $a$ or removably fitted therein.

$l$ designates a drive shaft extending in concentric relation through the sleeve $i$, and keyed on the inner end of the shaft is a small bevel pinion $m$, adapted to constantly engage in mesh with a larger bevel pinion $n$ keyed on the end of the main drive shaft $f$.

Keyed on the outer end of the shaft $l$ is a sprocket wheel $o$ and passing around the sprocket $o$ and a sprocket $p$ keyed on a small spindle $q$ journaled in the outer end of the swinging arm $d$ is a sprocket chain $r$ for transmitting a continuous driving power for rotating the cutting disk keyed to the end of the spindle $q$.

$e$ designates a circular disk cutting knife removably keyed on the end of the spindle $q$. The disk is suitably protected by a guard $t$ connected with the swinging arm $d$, and cut away at one section to expose the edge of the cutting knife, to permit it to readily engage against the cutting edge of the base, when the swinging arm is actuated forwardly in the course of operation. The disk cutting knife is held in removable connection with the spindle $q$ by a lock nut $u$, and formed through the center part of the disk are a series of openings $v$ through which the fingers of a person may pass for conveniently removing the disk for sharpening, and for replacing the same.

$w$ designates a small pinion gear set on the drive shaft $f$, and adapted to be adjustably fixed thereon by a clutch member $x$ held by a locking bolt or screw.

Journaled in the side of the base is a gear $y$ adapted to mesh with the gear $w$ and through which the swinging arm $d$ is actuated, and also by which the spider frame $c'$ and the table $c$ is forwardly adjusted by means arranged in combination with the gears, and a cam $z$ formed on the side of the gear $y$.

Surrounded and fastened in a convenient manner to the sleeve $i$, intermediate the journals $j$ and $k$ is a collar 2, and connected in pivotal relation with the collar 2 is a yoke arm 3. The yoke arm 3 is fitted with a connecting pin 4 engaging in projecting and extendible relation with the end of the yoke arm. The front end of the pin 4 is pivotally connected with the side face of the gear $y$ in any suitable manner, so that with the revolution of the gear $y$ and by the connection with the yoke arm 3, the swinging arm $d$ will be actuated forwardly and backwardly. With each complete revolution of the gear $y$ the swinging arm $d$ travels forwardly to make the cut, and returns to the normal or starting position. The one half revolution of the gear $y$ and by its connection with the collar 2 rocks the swinging arm $d$ forwardly, and the other half revolution returns it to the normal or starting position, or with each complete revolution of the gear $y$ the rocking arm $d$ will be actuated forwardly and backwardly.

Pivotally connected with a bar 5 extending across and fixed to the sides of the base is a tripping lever 6 adapted to control the width of the cut by the knife. The end of the tripping lever is set to engage with a gage adjustment fitted in the base. The adjustment is made by a push rod 7 extending through the side wall of the base, and connected at the inner end with a block 8 slidably mounted on a rod 9 extending across the interior of the base. The end of the tripping lever 6 engages in between the block 8 and a pin 10 projecting upwardly from the top edge of the push rod 7.

Extending longitudinally through the interior of the base is a rocking shaft 11, on which is set a tripping arm 12 adapted to engage with the face of a cam $z$ formed on the side of the gear $y$, once with each revolution of the gear. By the engagement of the cam with the tripping arm 12 the rocking shaft 11 will partially turn, and actuate a ratchet 14 keyed on the end of a feeding screw 15 set in the top part of the rear end of the base. The ratchet 14 is operated by a pawl 17 tripped by a lever link 16 keyed on the rocking shaft 11. 16' designates a small tension spring connected and extending between the lever link 16 and the side wall of the base, by which the tripping arm 12 projecting from the rocking shaft 11 is held in position to contact with the cam $z$ as the gear $y$ revolves.

Set on the rocking shaft 11 is an adjusting block 18 adapted to engage with the inner end of the tripping lever 6 and limit the extent of the turning of the rocking shaft by the engagement with the inner end of the tripping lever, and thereby control the throw of the lever link 16, and the extent of the rotation of the ratchet 14, connected with the lever link 16, by which the turning of the feeding screw 15 is regulated, and set, to limit the traveling movement of the table $c$ forwardly, to carry the meat to the cutting edge of the base to engage with the cutting disk.

Pivotally connected with the back edge of the spider frame $c'$ is a dog 19, held in engagement to mesh with the screw 15 by a small tension spring 19' carried over and connected with the inner side wall of the base $a$, so that with the turning of the screw 15 the table $c$ carried by the spider frame $c'$ will slowly move forward, the distance being regulated by the adjustment as fixed by the push rod 7, and the tilt of the rocking shaft 11 as actuated by the engagement with the cam $z$. With each partial turn the pawl will rotate a degree of a circle, and the table will be moved forwardly a corresponding distance.

The end of the screw 15 projects out through the back end of the casing, and is formed with a finger grip 21 by which the screw may be manipulated and turned in either direction, to advance the table $c$ forwardly more rapidly than by the operation by the mechanism within the casing, driven by the hand wheel, or for the purpose of slightly adjusting the table backwardly if so desired.

19$^a$ designates a tripping rod connected with the dog 19. The rod extends out between the table top $b$ and the top edge of the base, and is connected with a lever arm 19$^b$ pivotally connected with some part of the spider frame $c'$. The object of the tripping rod is to disengage the dog from the screw for the purpose of sliding the table backwardly or forwardly by hand or for any other purpose in the operation of the device.

The operation of the device is as follows:—The hand wheel $g$ is turned by the handle $h$ and the shaft $f$ turns therewith, so that with the meshing of the bevel gear keyed on the end thereof, and with the bevel gear keyed on the end of the knife shaft passing centrally through the sleeve forming part of the swinging arm, the shaft will rotate, and turn therewith the sprocket wheel keyed on the end thereof, and drive the sprocket chain passing therearound, and around the sprocket wheel keyed on the end of the knife spindle, and revolve the knife. At the same time the gear $w$ set on the drive shaft $f$ drives the gear $y$ in mesh therewith, and through the yoke arm connection with the gear and collar 2, pivotally connected with the sleeve of the swinging arm, will cause the swinging arm to rock forwardly and backwardly with each complete revolution of the gear $y$.

By the revolution of the gear $y$ and the engagement of the rocking shaft, and the parts arranged in combination therewith, certain functional action is effected by the engagement of the tripping arm 12 and the cam $z$ formed on the side of the gear, by which the table top will advance forwardly in regular movement intermittent with the forward and backward travel of the swinging arm.

Various modifications may be made in the arrangement and design of the several parts without in any way deviating from the nature of my invention.

What I claim as new and desire to secure by Letters Patent is:—

1. In a meat slicing device, a suitable base having a removable and adjustable cover formed therewith, a drive shaft suitably journaled in said base, and means fitted on the outer end of said shaft for turning same, a swinging arm having a sleeve formed at right angles therewith, said sleeve suitably journaled through the end of said base, and at right angles with said drive shaft, a drive shaft journaled centrally through said sleeve, a collar and yoke arm fitted with the said sleeve, gears suitably arranged within said base and with said drive shafts, said gears being pivotally arranged with the said yoke arm and adapted to actuate said sleeve and swinging arm in a forwardly and backwardly direction against the upper front edge of the said base, a rotatable cutting disk suitably journaled in the upper end of the said swinging arm, and means arranged with said gears for rotating said cutting disk, substantially as described.

2. In a meat slicing device, a suitable base provided with a removable top, a drive shaft suitably journaled in said base, said shaft extending out through the side of said base and provided with means for turning same, a swinging arm formed with a sleeve at right angles suitably journaled through the end of said base, and at right angles with said drive shaft, a drive shaft journaled in said sleeve, a collar and yoke arm pivotally fitted with the said sleeve, said yoke arm being pivotally connected with a gear wheel suitably journaled within the said base, said gear adapted to be rotated by a gear keyed on the said drive shaft, a rotary knife disk suitably journaled in the outer end of said swinging arm, suitable means arranged with said swinging arm for rotating said knife disk and said yoke arm connected with said gear adapted to transmit a rocking motion to said swinging arm, substantially as described.

3. In a meat slicing device, a suitable base in the form of a casing, a removable cover adapted to engage over the said base, a drive shaft journaled in said base, one end of said shaft projecting out through the side of said base, a hand drive wheel fitted on the end of said shaft, a swinging arm to which a cutting disk is rotatably journaled in the outer end thereof, a sleeve formed integrally and at right angles with said swinging arm, said sleeve adapted to extend into the interior of said base in journaled relation therewith, a shaft passing centrally through the said sleeve, a bevel gear keyed on the inner end of said shaft, said gear adapted to engage with a bevel gear keyed on the end of said drive shaft journaled in the said casing at right angles therewith, a gear set on the said drive shaft, said gear adapted to mesh with a gear journaled in the side wall of said base, a collar surrounding and fitted to said sleeve of said swinging arm, a yoke arm connected therewith and extending between said collar and in pivotal engagement with the outer face of said gear, said gear by revolving therein adapted to transmit a rocking motion in a forwardly and backwardly relation to the said swinging arm, a sprocket and chain driving mechanism arranged with the said knife disk, means fitted in the said casing and in combinational engagement with the said gear for intermittingly actuating the table top forwardly, substantially as described.

4. In a meat slicing device, a suitable base, an adjustable removable cover arranged therewith, a swinging arm supported in journaled relation with the said base, a rotatable knife disk suitably journaled in the outer end of said swinging arm, means arranged with the said swinging arm for rotating said knife disk, a drive shaft suitably journaled in the said base, the end of said drive shaft projecting out through the side wall of said base, means fitted on the outer end of said shaft for revolving same, a series of gears journaled within said base, and adapted to actuate said swinging arm backwardly and forwardly against the upper front edge of the said base, said gears arranged and adapted to revolve the said knife disk, and suitable means arranged with the said gears to advance the table top forwardly in an intermittent motion to carry the table and contents forwardly to engage with the cutting knife disk, substantially as described.

Signed at Toronto, this 31st day of August, 1920.

WILLIAM H. DONALD.

In the presence of—
 ANDREW A. ADAMS,
 CHAS. J. M. CAUGHLIN.